(12) United States Patent
Wawrzyniak et al.

(10) Patent No.: US 10,965,177 B2
(45) Date of Patent: Mar. 30, 2021

(54) PERMANENT MAGNET (PM) MACHINE HAVING ROTOR POLES WITH AN ARRAY OF PERMANENT MAGNETS

(71) Applicant: Otis Elevator Company, Farmington, CT (US)

(72) Inventors: Beata I. Wawrzyniak, South Windsor, CT (US); Jagadeesh Kumar Tangudu, South Windsor, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 289 days.

(21) Appl. No.: 16/029,221

(22) Filed: Jul. 6, 2018

(65) Prior Publication Data

US 2020/0014261 A1 Jan. 9, 2020

(51) Int. Cl.
*H02K 1/27* (2006.01)
*H02K 1/02* (2006.01)
*H02K 15/03* (2006.01)

(52) U.S. Cl.
CPC .............. *H02K 1/278* (2013.01); *H02K 1/02* (2013.01); *H02K 15/03* (2013.01); *H02K 2201/06* (2013.01)

(58) Field of Classification Search
CPC .. H02K 1/02; H02K 1/06; H02K 1/22; H02K 1/223; H02K 1/26; H02K 1/265;
(Continued)

(56) References Cited

U.S. PATENT DOCUMENTS 6,025,667 A 2/2000 Narita et al.
6,411,002 B1 6/2002 Smith et al.
(Continued)

FOREIGN PATENT DOCUMENTS

CN 100385779 C 4/2008
CN 103703523 A 4/2014
(Continued)

OTHER PUBLICATIONS

European Patent Office, Extended European Search Report, Application No. 19184816.7-1201, dated Nov. 21, 2019 (8 pp.).
(Continued)

*Primary Examiner* — Alex Torres-Rivera
*Assistant Examiner* — David A. Singh
(74) *Attorney, Agent, or Firm* — Cantor Colburn LLP

(57) ABSTRACT

A motor includes a plurality of ends, including a first end and an opposing second end, an outer surface of the magnetic carrier extends between the ends, and a plurality of magnetic poles including a first magnetic pole and a second magnetic pole, the plurality of magnetic poles disposed on the magnet carrier, extending between the ends, and being adjacent on the outer surface of the magnet carrier, wherein each of the plurality of poles comprising an array of magnets, each magnet in the array of magnets being a permanent magnet, each array of magnets comprising a plurality of magnets including a first magnet and a second magnet, the plurality of magnets differing from each other in one or more of material and magnetic field strength (MGOe), wherein the first plurality of magnets and the second plurality of magnets are adjacently disposed within the array of magnets.

10 Claims, 5 Drawing Sheets

(58) Field of Classification Search
CPC ........ H02K 1/27; H02K 1/2706; H02K 1/272; H02K 1/274; H02K 1/2753; H02K 1/278; H02K 15/02; H02K 15/03; H02K 2201/06; H02K 1/2746
See application file for complete search history.

(56) References Cited

U.S. PATENT DOCUMENTS

| | | | |
|---|---|---|---|
| 6,700,288 | B2 | 3/2004 | Smith |
| 7,057,323 | B2 | 6/2006 | Horst |
| 7,417,343 | B2 | 8/2008 | Lindberg et al. |
| 7,436,095 | B2 | 10/2008 | Aydin et al. |
| 9,287,742 | B2 | 3/2016 | Reddy et al. |
| 9,300,176 | B2 | 3/2016 | Saito et al. |
| 2006/0061226 | A1 | 3/2006 | Kim et al. |
| 2010/0171386 | A1 | 7/2010 | Kogure et al. |
| 2012/0262019 | A1 | 10/2012 | Smith et al. |
| 2013/0154398 | A1* | 6/2013 | Kim ............ H02K 1/06 310/12.24 |
| 2013/0169097 | A1 | 7/2013 | Saban et al. |
| 2015/0200572 | A1* | 7/2015 | Wu ............ H02K 1/274 290/55 |
| 2016/0352163 | A1 | 12/2016 | Kim |
| 2017/0229945 | A1 | 8/2017 | Harnsberger et al. |

FOREIGN PATENT DOCUMENTS

| | | |
|---|---|---|
| CN | 104578499 A | 4/2015 |
| CN | 104779720 A | 7/2015 |
| CN | 205081594 U | 3/2016 |
| EP | 1816725 A1 | 8/2007 |
| EP | 2149965 A1 | 2/2010 |
| EP | 2479872 A1 | 7/2012 |
| EP | 2704294 A1 | 3/2014 |
| EP | 2897265 A1 | 7/2015 |
| WO | 2014102751 A2 | 7/2014 |

OTHER PUBLICATIONS

Cetin, et al.; "Analyzing the Profile Effects of the Various Magnet Shapes in Axial Flux PM Motors by Means of 3-D-FEA"; 2018; MDPI; Basel Switzerland; 14 pages.

CN OA; Application No. 201910603861.1; dated Dec. 3, 2020; 7 pages.

EP OA; Application No. 19 184 816.1-1201; dated Nov. 20, 2020; 6 pages.

* cited by examiner

PERMANENT MAGNET (PM) MACHINE HAVING ROTOR POLES WITH AN ARRAY OF PERMANENT MAGNETS

BACKGROUND

Exemplary embodiments pertain to the art of permanent magnet (PM) machines and more specifically PM machines having a rotor poles comprising an array of permanent magnets.

Permanent magnet (PM) machines may consist of one type of permanent magnet located around a circumference of a rotor to constitute magnetic poles. The magnets may be located on the surface of the rotor or be embedded inside the rotor. The poles may consist of a single piece magnet or be segmented radially and/or axially for loss reduction, manufacturability, reduced cost, etc.

BRIEF DESCRIPTION

Disclosed is a motor for a permanent magnet machine, the motor comprising a magnetic carrier formed by a body so that the motor comprises a plurality of ends, including a first end and an opposing second end, an outer surface of the magnetic carrier extends between the plurality of ends, and a plurality of magnetic poles including a first magnetic pole and a second magnetic pole, the plurality of magnetic poles disposed on the magnet carrier, extending between the plurality of ends, and being adjacent on the outer surface of the magnet carrier, wherein each of the plurality of poles comprising an array of magnets, each magnet in the array of magnets being a permanent magnet, each array of magnets comprising a plurality of magnets including a first magnet and a second magnet, the plurality of magnets differing from each other in one or more of material and magnetic field strength (MGOe), wherein the first plurality of magnets and the second plurality of magnets are adjacently disposed within the array of magnets.

In addition to one or more of the above disclosed features and elements, or as an alternate, the array of magnets forms a rectangular grid.

In addition to one or more of the above disclosed features and elements, or as an alternate, the magnets are randomly intermixed in the array of magnets.

In addition to one or more of the above disclosed features and elements, or as an alternate, each of the magnets has a rectangular surface area.

In addition to one or more of the above disclosed features and elements, or as an alternate, each of the magnets is tapered on opposing diagonal edges and the opposing diagonal edges are aligned along a skew axis, wherein the skew axis is skewed to a long axis for the motor.

In addition to one or more of the above disclosed features and elements, or as an alternate, the array of magnets includes a plurality of sets of magnets having homogenous properties, wherein the array of magnets is configured as a mosaic that is symmetrically disposed about a skew axis that is skewed to a long axis of the motor.

In addition to one or more of the above disclosed features and elements, or as an alternate, the homogenous magnets are arranged in the mosaic so that the strongest magnets are clustered together and disposed on the skew axis and successively weaker magnets are successively offset.

In addition to one or more of the above disclosed features and elements, or as an alternate, the homogenous magnets are arranged in the mosaic so that the strongest magnets are clustered together and disposed on the skew axis and successively weaker magnets are successively layered in an outward direction.

In addition to one or more of the above disclosed features and elements, or as an alternate, the motor is a rotary motor, the magnetic carrier is a rotor and the plurality of ends are axial ends.

In addition to one or more of the above disclosed features and elements, or as an alternate, the array of magnets includes two or more of NdFeB, SmCo, AlNiCo and Ferrite.

Further disclosed is a method of configuring a motor for a permanent magnet machine, the comprising one or more of the above disclosed features and elements.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
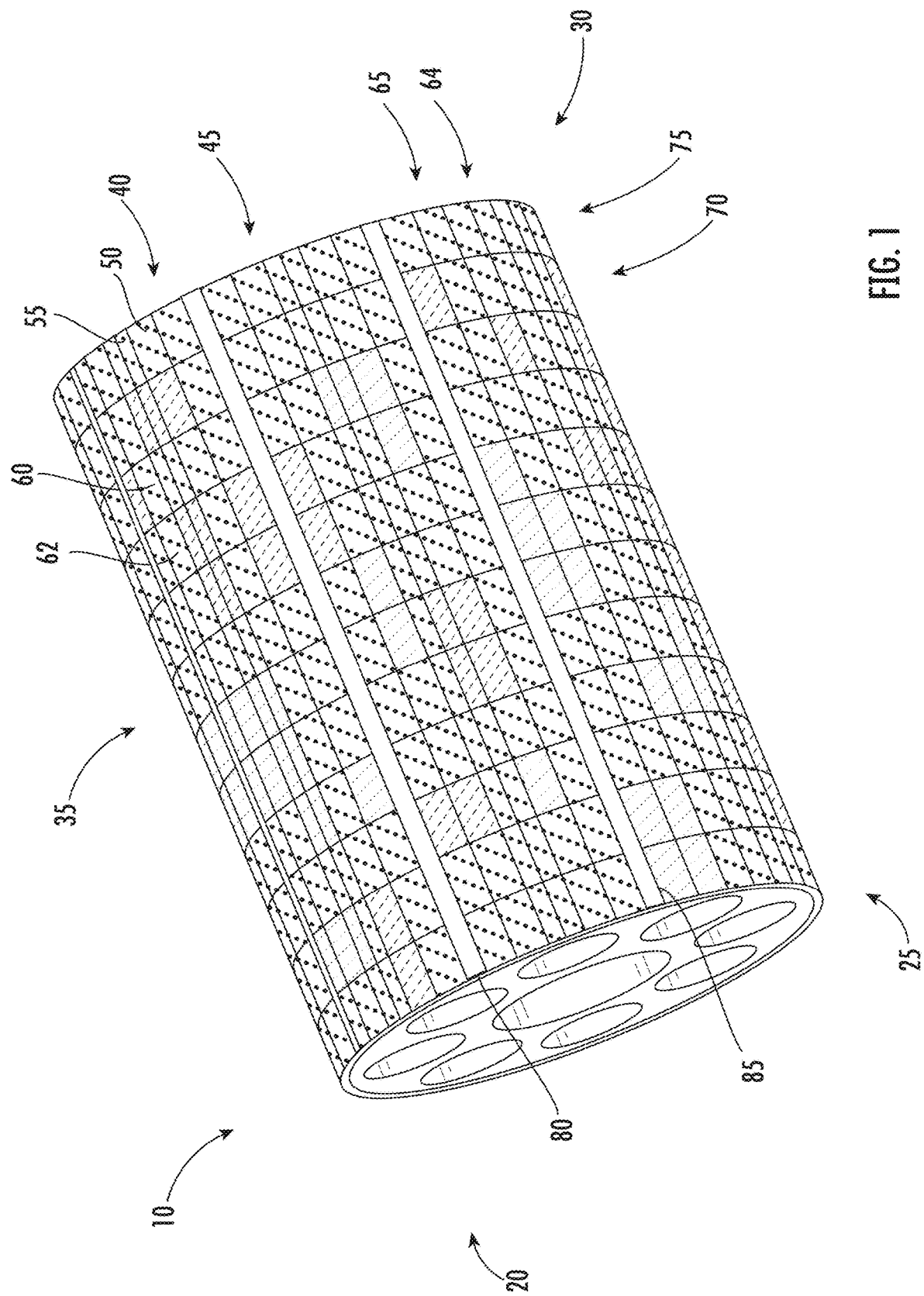
FIG. 1 illustrates a rotor according to a disclosed embodiment.

Turning to FIG. 1 disclosed is a rotor 10 for a motor. The rotor 10 may comprise a magnet carrier 20 formed by a cylindrical body, which may be ferromagnetic. From this configuration the rotor 10 may comprise a plurality of axial ends, including a first axial end 25 and an opposing second axial end 30. An outer surface 35 of the magnetic carrier 20 may extend between the plurality of axial ends.

The rotor 10 includes a plurality of magnetic poles including a first magnetic pole 40 and a second magnetic pole 45. The plurality of magnetic poles may be disposed on the magnet carrier 20 and may extend between the plurality of axial ends. Further, the plurality of poles may be circumferentially adjacent on the radial outer surface 35 of the magnet carrier 20. The plurality of poles form sets of poles about the rotor 10 as would be appreciated by one of ordinary skill. As the poles may be similarly applied to the rotor 10, reference hereinafter shall be to magnetic pole 40.

As illustrated in FIG. 1, the magnetic pole 40 may comprise an array of the magnets distributed axially between the axial ends 25 and 30 and circumferentially about the rotor 10. Magnets in single pole may be distributed along a fraction of a circumference of the rotor, wherein the fraction may be inversely proportional to the number of poles of the rotor. For a rotor with two poles, magnets for a first pole on the rotor may span one half (approximately fifty percent) of the circumference of the rotor. For a rotor with six poles, the magnets for a first pole on the rotor may span one sixth (approximate seventeen percent) of the circumference of the rotor.

The array includes a plurality of magnets including a first magnet 50 and a second magnet 55. The magnets may differ from each other in material type and magnetic strength (MGOe). In one embodiment the array of magnets may comprise between 30% and 40% variation in MGOe. In one embodiment a 35% variation in MGOe may be obtained by a random selection of magnets from a pool of 26 MGOe, 28 MGOe, 35 MGOe and 40 MGOe. These are exemplary values and one of ordinary skill would recognize that percentile variations and/or a various numbers and type of permanent magnets are within the scope of the disclosure.

The array of magnets may be configured as a rectangular array or grid over the outer surface 35 of the rotor 10. For example, the array of magnets may be configured in a plurality of axially extending rows of magnets including a first row of magnets 64 and a second row of magnets 65. The array of magnets may also include a plurality of circumferentially extending columns of magnets, including a first column of magnets 70 and a second column of magnets 75. In an embodiment the differing magnets may be randomly intermixed within the array of magnets. According to an embodiment each of the plurality of magnets may have a rectangular surface area, though other shapes that enable forming the plurality of poles may be within the scope of the disclosure.

In some embodiments the array of magnets may include two or more of NdFeB, SmCo, AlNiCo and Ferrite. In some embodiments the array of magnets may include recycled magnets.

A plurality of axially extending bosses including a first boss 80 and a second boss 85 may protrude radially outwardly from the radial outer surface 35 of the magnet carrier 20. The plurality of axially extending bosses may extend between opposing axial ends of the rotor core 10 to separate adjacent ones of the plurality of poles. In some embodiments instead of having a plurality of bosses the adjacent poles may be separated by corresponding circumferential spaces. In some embodiments the plurality of magnets may continuously cover the rotor core 10. In some embodiments the plurality of bosses may be ferromagnetic or non-magnetic. In some embodiments the plurality of bosses may be wedge shaped or may be a corresponding plurality of grooves in the core 10 enlarging magnetic separation between adjacent ones of the plurality of poles.

Figure 2:
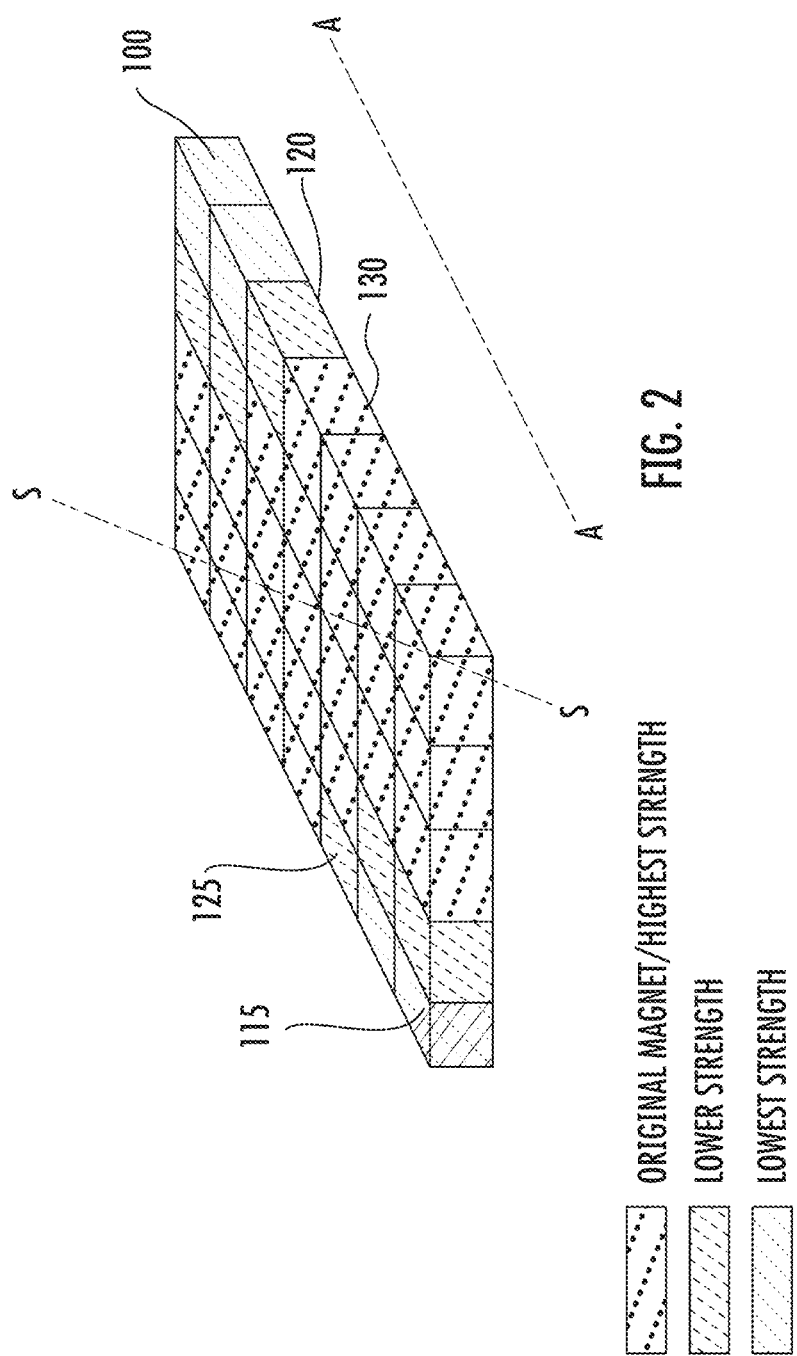
FIG. 2 illustrates a permanent magnet applied to the rotor according to a disclosed embodiment.

Turning to FIG. 2, the array may form a first mosaic of magnets that comprises a plurality of sets of magnets, wherein within each set of magnets has homogenous properties. The sets of magnets may include, for example, a first set distributed over first and second circumferentially outer portions 110, 115, a second set distributed over third and fourth circumferential intermediate portions 120, 125 and a third set distributed over a center fifth portion 130. The first set of magnets distributed over circumferential portions 110, 115 has a weaker magnetic strength than the second set distributed over circumferential portions 120, 125, which in turn has a weaker magnetic strength than the third set distributed over circumferential portion 130.

While it has been disclosed that the magnets may be randomly intermixed (FIG. 1), the sets of magnets may be configured in specific mosaics to provide specific results. That is, a typical motor may use magnets with uniform properties, and in the disclosed embodiments pole fields may be shaped by using magnets of various types and/or strengths in one or more sections of a pole. The disclosed take advantage of the fact that different types of magnets may have the same strength (MGOe) and yet may differ with respect to other parameters such as remanence or coercivity.

Figure 3:
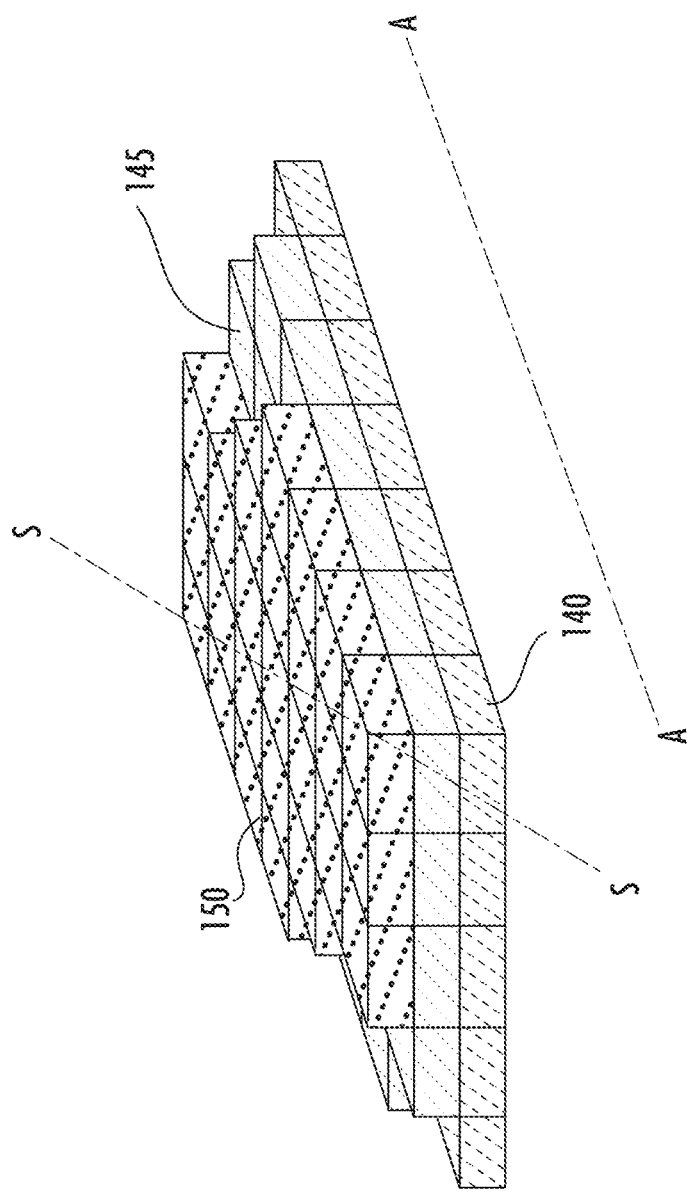
FIG. 3 illustrates a skewed array of permanent magnets applied to the rotor according to a disclosed embodiment.

However, as illustrated in FIGS. 2 and 3, the sets of magnets may be configured in mosaics that are skewed to the long axis A-A of the rotor 10 and/or configured in a tapered arrangement, where the tapering may be according to magnetic strength and number of magnets. In addition, the mosaics may be symmetric about a skew axis S-S. Such mosaics and variations thereof may offset torque ripples induced by using different types of magnets.

FIG. 2, for example, the sets are provided in a first mosaic on the outer surface 35 of the rotor 10. In the first mosaic each of the sets are axially skewed from long axis A-A and are symmetric about skew axis S-S. The first set of magnets 10 may be disposed in the center of the mosaic, the second set of magnets may be is divided outside of the first set, and the third set of magnets may be divided outside the second set. In addition, the first mosaic may include more magnets from the first set than the second set, and more magnets from the second set than the third set.

Further, FIG. 3 illustrates a second mosaic on the outer surface 35 of the rotor 10. In the second mosaic, the sets of magnets are layered so that the first set 100 is bottom layer, the second set is a middle layer 145 and the third set is a top layer. Further, the top layer 150 and the middle layer 145 are skewed from the long axis A-A and centered about a skew axis S-S. The bottom layer 150 is illustrated as being rectangular and aligned with the long axis of the rotor 10 and having a diagonal along the skew axis S-S so that the second mosaic is also symmetric about the skew axis S-S. In addition, the second mosaic may also include more magnets from the first set than the second set, and more magnets from the second set than the third set.

Figure 4:
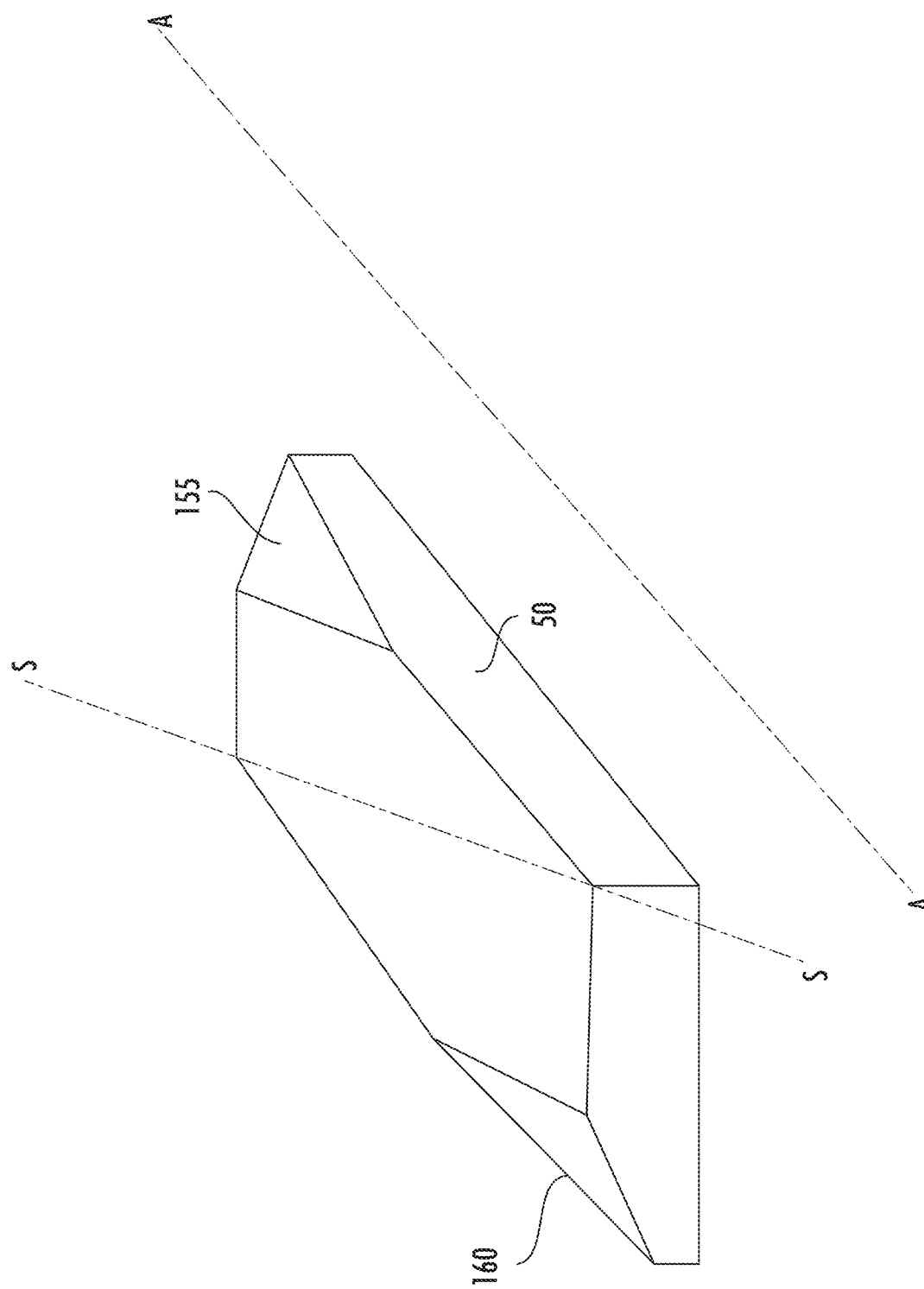
FIG. 4 illustrates a permanent magnet applied to the rotor according to a disclosed embodiment.

Turning to FIG. 4, a magnet, such as the first magnet 50, may be tapered on opposing diagonal edges, including first edge 155 and second edge 160. Further, the diagonal edges are disposed on a skew axis S-S that is skewed from the long axis A-A for the rotor 10. The edge tapering of certain ones of the plurality of magnets and axially aligning as indicated may provide an effect similar to that in FIGS. 2 and 3.

The above configurations illustrated in FIGS. 2-4, as indicated, may result in a reduction in torque ripples. These configurations, however, are not intended to be limiting.

Figure 5:
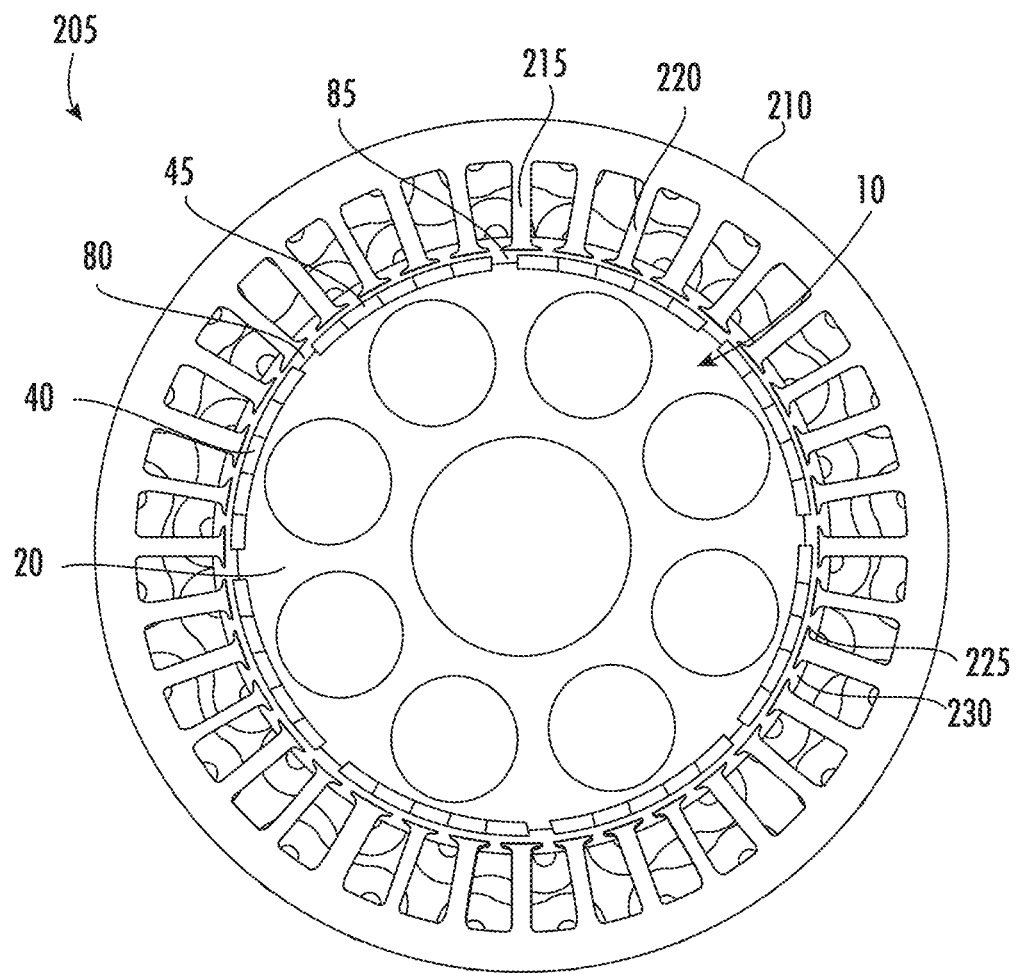
FIG. 5 illustrates a machine according to an embodiment.

As illustrated in FIG. 5, a PM machine 205 is disclosed that may comprise the rotor 10 disclosed above. As disclosed the rotor 10 may include the magnet carrier 20, the first magnetic pole 40, the second magnetic pole 45, the first boss 80 and the second boss 85. In addition, the PM machine 205 may include a stator 210 radially outside of the rotor core 10. The stator 210 may comprise a plurality of circumferentially spaced teeth including a first tooth 215 and a second tooth 220. The plurality of teeth may extend radially inwardly and a plurality of slots including a first slot 225 and a second slot 230 may be formed between the plurality of teeth. In one embodiment the plurality of slots may be skewed circumferentially between the opposing axial ends. The benefit of skewing the slots, as with providing a skewed configuration to the magnets on the outer surface 35 of the rotor core 10, may be offsetting torque ripples induced by the use of permanent magnets.

The disclosed architecture may allow utilization of various strength magnets (different MGOe or energy product) that may be sourced from permanent magnets, for example during a recycling process. The disclosed embodiments may utilize magnets, newly manufactured or recycled, and if recycled, with minimum rework required limited for cutting magnets to shape. For permanent magnet (PM) machines with poles comprising a relatively high number of magnets, random placement of different strength magnets may create a mosaic with a preferred range of averaged strength properties. While a mosaic of various magnets may contribute to small increase of torque ripples, such may be addressed by other means such as the disclosed stator skew. For easier manufacturing, magnets may be clustered and bonded together. The disclosed embodiments may be applied to interior PM machines with individual pole configurations that enable sectioning of the magnets.

The disclosed embodiments may allow for a reduction of cost. For example, cost reduction may be achieved by using recycled magnets, and/or using magnets with various properties, including but not limited to a combination of two or more of NdFeB, SmCo, AlNiCo, Ferrite, etc. The disclosed embodiments may result in reducing an environmental impact due to ease of manufacturing as well as an ability to use recycled magnets. It is to be appreciated that the above disclosure may apply to linear motors as well as rotary motors.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A motor for a permanent magnet machine, the motor comprising
    a magnetic carrier formed by a body so that the motor comprises a plurality of ends, including
        a first end and an opposing second end,
        an outer surface of the magnetic carrier extends between the plurality of ends, and
        a plurality of magnetic poles including a first magnetic pole and a second magnetic pole,
        the plurality of magnetic poles disposed on the magnet carrier, extending between the plurality of ends, and being adjacent on the outer surface of the magnet carrier,
    wherein
    each of the plurality of poles comprising an array of magnets,
    each magnet in the array of magnets being a permanent magnet,
    each array of magnets comprising a plurality of magnets including a first magnet and a second magnet, the plurality of magnets differing from each other in one or more of material and magnetic field strength (MGOe),
    wherein the first plurality of magnets and the second plurality of magnets are adjacently disposed within the array of magnets;
    wherein
    the array of magnets forms a rectangular grid and each of the magnets has a rectangular surface area;
    the array of magnets includes a plurality of sets of magnets having homogenous properties, wherein the array of magnets is configured as a mosaic that is symmetrically disposed about a skew axis that is skewed to a long axis of the motor,
    wherein the homogenous magnets are arranged in the mosaic so that:
        the strongest magnets are clustered together and disposed on the skew axis and successively weaker magnets are successively offset; or
        successively weaker magnets are successively layered in an outward direction.

2. The motor of claim 1 wherein
the magnets are randomly intermixed in the array of magnets.

3. The motor of claim 1 wherein
each of the magnets is tapered on opposing diagonal edges and the opposing diagonal edges are aligned along a skew axis, wherein the skew axis is skewed to a long axis for the motor.

4. The motor of claim 1 wherein the motor is a rotary motor, the magnetic carrier is a rotor and the plurality of ends are axial ends.

5. The motor of claim 1 wherein the array of magnets includes two or more of NdFeB, SmCo, AlNiCo and Ferrite.

6. A method of configuring a motor for a permanent magnet machine, the method comprising:
    forming a magnetic carrier that includes by a body including a plurality of ends, including
        a first end and an opposing second end,
        an outer surface of the magnetic carrier extending between the plurality of ends, and
    forming on the magnetic carrier a plurality of magnetic poles including
        a first magnetic pole and
        a second magnetic pole,
        the plurality of magnetic poles extending between the plurality of ends, and being adjacent on the outer surface of the magnet carrier,
    wherein
    each of the plurality of poles comprising an array of magnets, each magnet in the array of magnets being a permanent magnet,
    each array of magnets comprising a plurality of magnets including a first magnet and a second magnet, the plurality of magnets differing from each other in one or more of material and magnetic field strength (MGOe), wherein the first plurality of magnets and the second plurality of magnets are adjacently disposed within the array of magnets;
    wherein
    the array of magnets forms a rectangular grid and each of the magnets has a rectangular surface area;
    the array of magnets includes a plurality of sets of magnets having homogenous properties, wherein the array of magnets is configured as a mosaic that is symmetrically disposed about a skew axis that is skewed to a long axis of the motor, wherein the homogenous magnets are arranged in the mosaic so that:
the strongest magnets are clustered together and disposed on the skew axis and successively weaker magnets are successively offset; or
successively weaker magnets are successively layered in an outward direction.

7. The method of claim 6 wherein
the magnets are randomly intermixed in the array of magnets.

8. The method of claim 6 wherein
each of the magnets is tapered on opposing diagonal edges and the opposing diagonal edges are aligned along a skew axis, wherein the skew axis is skewed to a long axis for the motor.

9. The method of claim 6 wherein the motor is a rotary motor, the magnetic carrier is a rotor and the plurality of ends are axial ends.

10. The method of claim 6 wherein the array of magnets includes two or more of NdFeB, SmCo, AlNiCo and Ferrite.

* * * * *